Patented Dec. 29, 1942

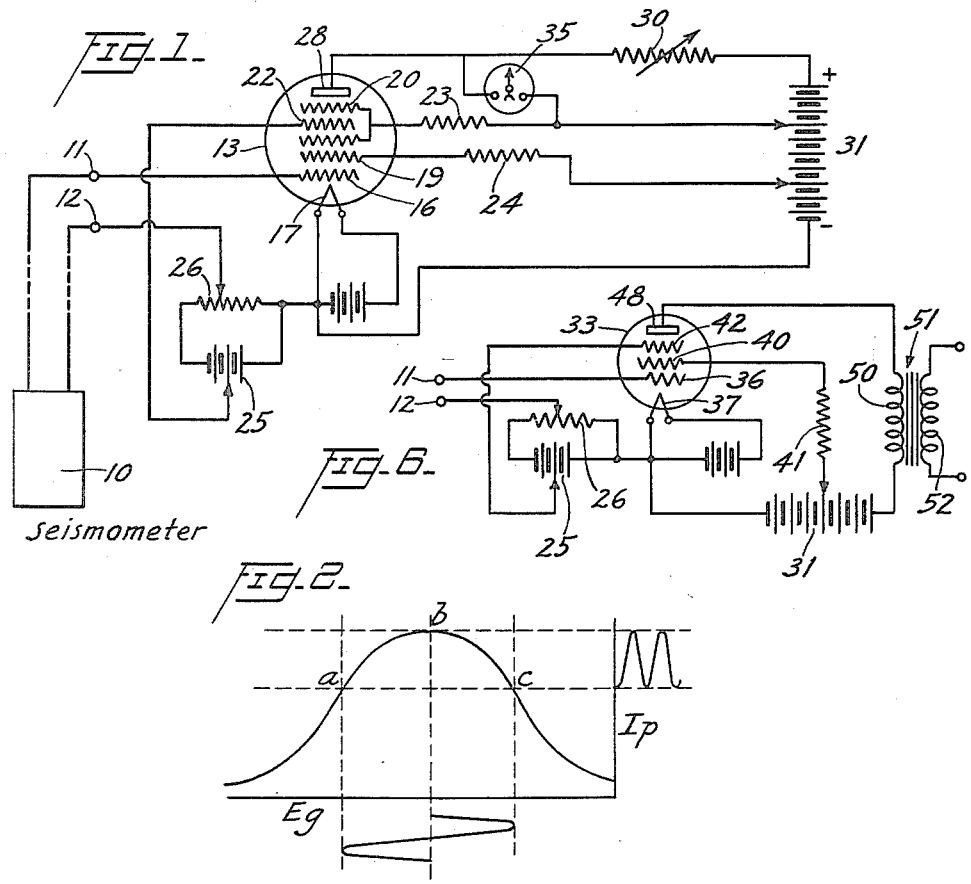

2,306,458

UNITED STATES PATENT OFFICE 2,306,458

MEASURING AND RECORDING APPARATUS

William H. Mayne, San Antonio, Tex., assignor to Olive S. Petty, San Antonio, Tex.

Original application June 1, 1940, Serial No. 338,440. Divided and this application June 24, 1941, Serial No. 399,550

1 Claim. (Cl. 177—352)

This invention relates to apparatus and methods for use in electrical circuits and is particularly concerned with circuits adapted to be supplied with wave form electrical energy. It is one of the objects of the invention to provide a novel and efficient means for measuring and/or recording electrical energy.

It has heretofore been proposed to employ thermionic valve circuits in the measurement of small voltages, and particularly of alternating voltages. Such arrangements have, however, been subject to various well recognized defects which it is the object of the instant invention to overcome.

Thus I have discovered that the characteristics of a thermionic valve of conventional type may be so adjusted by suitable selection of the voltages applied to the various elements of the valve that the relationship between the grid voltage and the anode current can be caused to assume the form of a parabola through and beyond the parabolic vertex. Consequently, if the valve be biased to afford a static operating point substantially at the parabolic vertex, the anode current will be representative of the square of the input voltage applied to the control grid. It is then possible, by supplying this anode current to a measuring and/or recording instrument affording a response commensurate with the average value of a pulsating current to obtain an indication of the effective value of the applied voltage.

It is therefore a further and more specific object of the invention to provide, in combination with a thermionic valve circuit adjusted as described, measuring means such as a D'Arsonval galvanometer for the valve output, whereby effective values of the applied grid voltage may be indicated directly and independently of the wave form. Still a further object of the invention is to provide, in association with such a valve, measuring means such as a recorded oscillograph for tracing the full wave squared curve of the control voltage applied to the valve grid.

The invention also contemplates the application of a thermionic valve circuit adjusted as described to any field in which it is desired to raise wave form electrical energy to the second or higher power. Thus the circuit may be employed in the field of seismic surveying, in which seismic impulses are converted into electrical wave form energy for subsequent recording, the squaring of the energy serving the purpose of exaggerating larger impulses on the record at the expense of smaller impulses, for example stray and unwanted impulses. As a modification of the invention, specifically applicable to the field of seismic surveying, I propose to employ, in lieu of the thermionic valve circuit in question, some other type of device for squaring the energy derived from seismic impulses. The instant application is particularly directed to these and other related adaptations of the invention to seismic exploration and apparatus, other uses and further and broader aspects of the invention being claimed more especially in my prior application Serial No. 338,440, filed June 1, 1940, of which this application is a division.

Further objects and features of the invention will be apparent from the following description taken in connection with the accompanying drawings, in which:

Figure 1 is a diagrammatic representation of an electrical circuit, indicating one method of applying the instant invention to the measurement of pulsating electrical energy;

Figure 2 represents generally the grid voltage-anode current curve of the thermionic valve included in the circuit shown in Figure 1;

Figure 4:
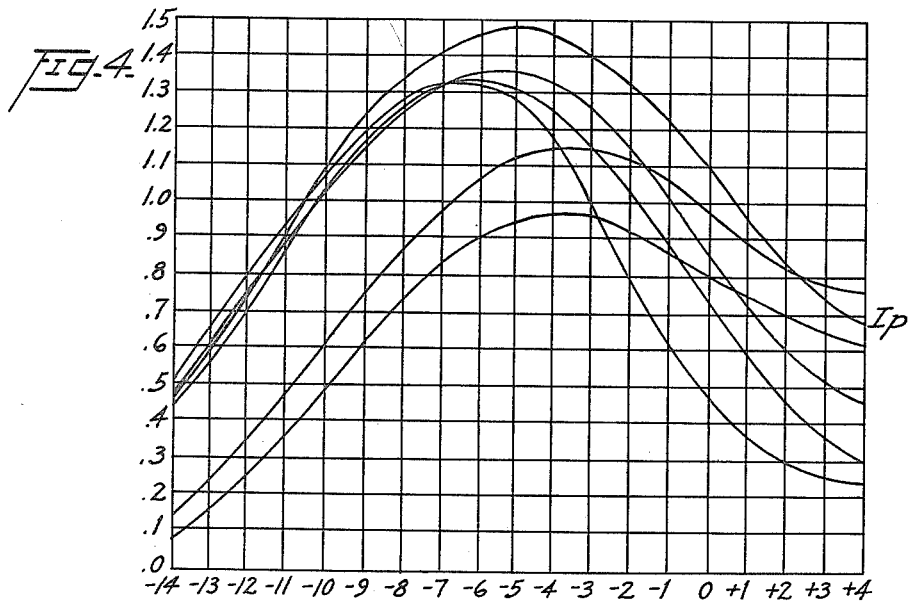
Figure 5:
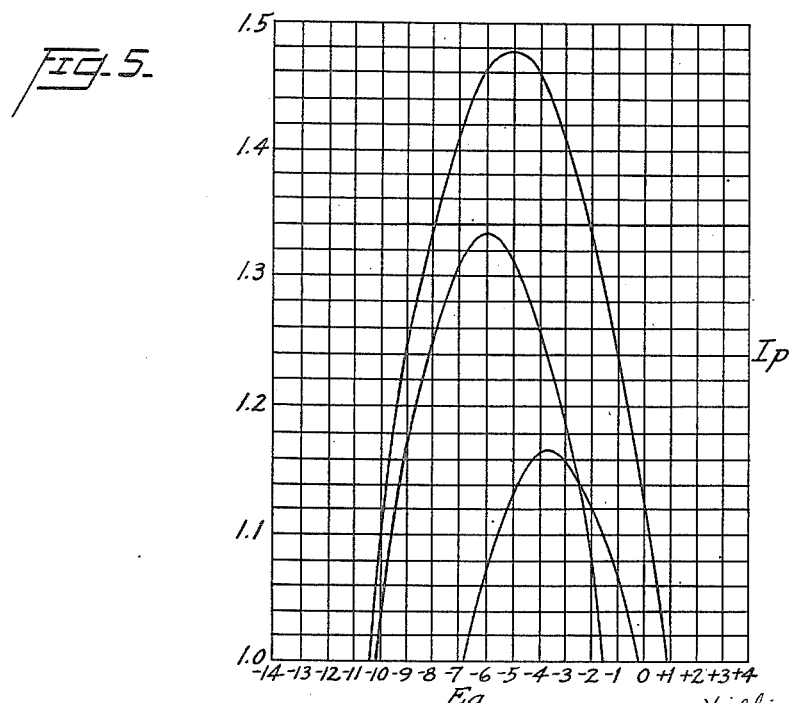

Figure 3 diagrammatically illustrates the application of the invention to the field of seismic surveying by the use of modified apparatus;

Figures 4 and 5 are characteristic grid voltage-anode curernt curves of thermionic valves such as may be employed in the practice of the invention; and Figure 6 is a circuit diagram illustrating the use of the invention for frequency multiplication.

In order to facilitate an understanding of the invention, reference will be made to the several embodiments thereof illustrated in the accompanying drawings and specific language will be employed. It will nevertheless be understood that various further modifications of the devices illustrated herein, such as would fall within the province of those skilled in the art to construct are contemplated as part of the present invention.

In Figure 1 of the drawings the reference numeral 10 represents diagrammaticaly a source of electrical energy, for example wave form energy. Thus the source 10 may be a seismometer for use in seismic surveying, the seismometer serving to convert into electrical wave form energy seismic impulses which may be propagated as the result of detonation of an explosive charge in accordance with methods commonly practiced in this field. The seismometer may be constructed as disclosed more particularly in the application of Olive S. Petty, Serial No. 324,013, filed March 14, 1940, in which the seismic impulse are caused to vary the impedance of an oscillating circuit, and thereby the output of the circuit.

Whatever the nature of the source 10, it will be understood that there is preferably delivered to the terminals 11 and 12 a varying or pulsating electrical energy which it is desired to measure, record, or otherwise to deal with as hereinafter more particularly described.

From terminals 11 and 12, the energy is fed to an electrical circuit including a thermionic valve 13, the characteristics of the latter being so adjusted that the output current of the valve varies substantially as the square of the input voltage. In the preferred practice of the invention, the desired result is achieved by applying, to certain elements of the valve, voltages which are such that the characteristic anode current-grid voltage curve thereof is substantially parabolic over a range commensurate with the range of voltages to be supplied to the valve control grid and extending on both sides of the parabolic vertex, the valve being biased to a static operating point at the parabolic vertex.

The valve shown at 13 is of the multi-grid type, input terminal 11 applying a varying voltage to control grid 16 and input terminal 12 being connected to the cathode 17 of the valve. The valve may also include high voltage grids 19 and 20, the latter being of the screen type, and a low voltage grid 22 which is connected to the cathode through a variable tap on a source 25 of grid bias voltage. The high voltage grids are preferably supplied with biasing voltage through resistances 23 and 24. An appropriate potential for the control grid 16 is established by means of a potentiometer 26 connected across the source 25. The anode 28 is connected through a variable resistance 30 to the positive terminal of a source 31 of anode voltage, the negative terminal being returned to the cathode 17. A measuring and/or recording device 35 is arranged in shunt between the anode 28 and the screen grid 20 so as to indicate the drop in voltage across the variable resistance 30, and thereby the anode current.

It will be appreciated that in practice it may be necessary to provide amplification of the wave form signal energy additional to that afforded by the illustrated circuit, and the invention contemplates the employment of further amplifying stages at any convenient point in the system.

The significant feature of the illustrated circuit is its ability to square the incoming signal energy. Thus the circuit is adjusted, as hereinbefore explained, to provide an approximately parabolic anode voltage grid current characteristic, such for example, as is diagrammatically represented in Figure 2. In this figure, the upper portion of the curve between the points $a$ and $c$ is generally parabolic, and the valve 13 is normally biased so as to establish a static operating point at the parabolic vertex $b$. It will thus be apparent that as the voltage applied to the grid 16 varies between $a$ and $c$, the anode current will vary as the square of that voltage.

If the measuring instrument 35 is a galvanometer of the D'Arsonval type having a long period as compared to the received frequencies, such instrument will indicate effective values of the grid voltage wave directly, linearly, and independently of the form of the wave, since the average of a squared wave is the effective value of the original wave. To standardize the instrument readings it is necessary only to adjust initially the variable resistance 30 so that the voltage applied to the instrument 35 is within the range of scale readings, then to adjust the potentiometer 26 so as to bias the valve 13 for operation at the point $b$ of the voltage-anode current curve, at which point the response of the instrument is at a minimum, and finally to adjust the variable resistance 30 so that the instrument reads zero in the absence of applied control voltage. By properly calibrating the linear scale of the meter, a reading of the applied signal may be obtained directly in the numerical value of the effective voltage.

In the use of the invention in certain fields, for example in the field of seismic surveying, it is customary to employ a recording oscillograph, for example a string galvanometer. The use of such a device at 35 permits the tracing of the squared curve of the alternating voltage applied to the control grid 16 of the valve. In this connection it may be noted that the full wave of the applied signal is measured, so that the resultant trace is wholly independent of wave form. The errors attendant upon the more conventional half-wave rectification by means of a valve biased to cutoff are thus eliminated. Similarly, the present invention gives results definitely superior to those obtained with full wave circuits employing two valves, such circuits being difficult of adjustment as regards the point of cutoff and involving other disadvantages which are eliminated by the instant arrangement.

In Figure 4 is shown a series of curves representing the grid voltage-anode current characteristics of valves of the general type shown in Figure 1. The difference in the shape of the several curves is the result of differences in the circuit constants selected, and the generally parabolic shape of all of the curves was obtained by suitable adjustment of the voltages applied to the several elements of the valves, and primarily by the application of a substantially higher voltage to the screen grid 20 than is normally employed. Numerous combinations of voltages which will afford generally parabolic curves extending on each side of the vertex may be employed in widely divergent types of valve. The operating portion of the curve may in some instances be inverted, the vertex being below the adjacent curve sections.

By way of example, and without limitation of the scope of the invention, the following constants were applied to a valve of the 1A7–G type, reference being made to the numerals applied to the elements of the valve shown in Figure 1 for identification of the respective elements:

|  | Volts |
|---|---|
| Grid 16 | −4.8 |
| Grid 19 | 22.25 |
| Grid 20 | 89. |
| Grid 22 | −2.9 |
| Anode 28 | 86. |

While valves of the so-called "pentagrid converter type," such as the valves just described, are particularly suited to the practice of the instant invention, various other types of valve may be successfully employed. In general it is desirable to employ a valve having at least three grids, the intended result being achieved by the application of negative bias voltage to the first and third grids, and a relatively high positive voltage to the intermediate grid, preferably through a resistor.

In Figure 5 the upper portion of several of the curves appearing in Figure 4 is represented on a scale in which the ordinates are expanded. The close approximation of these curves to the parabolic form is at once apparent from this figure. The highest curve in Figures 4 and 5 was obtained by the use of the voltages above set forth.

The circuit hereinbefore described is especially advantageous where it is desired to measure the effective value or record the instantaneous value of wave form energy with accuracy. In the field of seismic surveying, however, accuracy of representation of wave form is often not essential and it is possible to employ apparatus of less accuracy which will emphasize impulses of higher amplitude by raising the energy to the second or some higher power. Thus reasonably satisfactory results may be achieved in this field by the use of an arrangement such as that illustrated in Figure 3, which employs a meter 60 of the moving coil type, the moving coil 61 and the fixed coil 62 being arranged in series. Energy may be supplied to the coils from a conventional thermionic valve amplifier 65, the latter receiving the output of a seismometer 10. Alternatively, thermionic valve circuits affording an output which is generally representative of the square of the input voltage may be employed, for example circuits such as are commonly used in voltmeters of the thermionic valve type, the valve or valves being biased to cutoff and having generally parabolic grid voltage-anode current characteristics adjacent the cutoff point.

By the use of two or more of the circuits herein-described in series, higher powers of the applied voltage may be derived. Multiplication of signal energy from different sources by the application of the instant invention is dealt with more partiticularly in my copending application, Serial No. 338,439, filed June 1, 1940.

It will be apparent from Figure 2 of the drawings that the frequency of the direct current pulsations of the valve output is twice the frequency of alternation of the voltage applied to the control grid. It is therefore possible to derive from the output current an alternating current which is a pure second harmonic of the input voltage, for example by the employment of a transformer in the anode circuit of the valve.

Such an arrangement is illustrated in Figure 6 of the drawings, this figure serving also to illustrate the use of a pentode valve in the practice of the instant invention. The circuit shown in Figure 6 is essentially the same as that represented in Figure 1, and similar reference characters are employed to designate identical elements functioning similarly, it being understood that the seismometer output may be applied to the terminals 11 and 12, as in Figure 1. The valve 33 includes a cathode 37, a control grid 36, a screen grid 40, a suppressor grid 42, and an anode 48. A small negative bias is applied to the grids 36 and 42 by the source 25 and a relatively high positive potential is applied to the screen 40 by the source 31 through a resistor 41; source 31 also supplies voltage to the anode 48 through the primary winding 50 of a transformer 51, the output of which may be recorded as hereinbefore described on an oscillograph or like recording instrument. The voltages applied to the several elements of the valve are so chosen, as hereinbefore explained, that the grid voltage-anode current curve is parabolic, the static operating point being located substantially at the vertex of the parabola.

It will be appreciated from the foregoing that the current flow in the secondary winding 52 of the transformer 51 will represent the alternating current component of the valve output, and that this component will vary at a frequency twice that of the original signal. The arrangement is distinctly superior to more conventional circuits for obtaining frequency multiplication, since it is unnecessary to employ elaborate filters for the elimination of undesired harmonics. The signal frequency can of course be further multiplied, if desired, by feeding the signal successively through a plurality of circuits of the type shown in Figure 6.

Having thus described the invention, what is claimed as new and desired to be secured by Letters Patent is:

In apparatus for use in seismic surveying, the combination with a seismometer for converting seismic energy into electrical wave form energy, of means for amplifying and recording said wave form energy, said recording means including an energy squaring device, said device including a recording oscillograph of the electro-dynamometer type having fixed and movable coils, and means energizing both of said coils with said wave form energy.

WILLIAM H. MAYNE.